(12) United States Patent
Kurosu

(10) Patent No.: US 8,240,687 B2
(45) Date of Patent: Aug. 14, 2012

(54) WHEEL SUSPENSION SYSTEM FOR A STEERABLE WHEEL

(75) Inventor: Norikazu Kurosu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 12/667,620

(22) PCT Filed: Jul. 3, 2008

(86) PCT No.: PCT/JP2008/001775
§ 371 (c)(1),
(2), (4) Date: Jan. 4, 2010

(87) PCT Pub. No.: WO2009/004820
PCT Pub. Date: Jan. 8, 2009

(65) Prior Publication Data
US 2010/0181740 A1  Jul. 22, 2010

(30) Foreign Application Priority Data
Jul. 4, 2007 (JP) .................................. 2007-175893

(51) Int. Cl.
*B62D 7/16* (2006.01)
*B62D 7/18* (2006.01)
*B60G 3/18* (2006.01)

(52) U.S. Cl. ....... 280/93.511; 280/93.512; 280/124.135; 280/124.138; 280/124.15

(58) Field of Classification Search .......... 280/93.511, 280/93.512, 124.134, 124.135, 124.138, 280/124.15; 403/53, 56
See application file for complete search history.

(56) References Cited

U.S. PATENT DOCUMENTS

| 4,878,688 A | | 11/1989 | Kubo |
| 4,941,677 A | * | 7/1990 | Matsumoto et al. ... 280/124.138 |
| 6,164,860 A | * | 12/2000 | Kondo .......................... 403/132 |
| 2003/0107201 A1 | | 6/2003 | Chun |
| 2008/0231010 A1 | | 9/2008 | Buhl et al. |

FOREIGN PATENT DOCUMENTS

| DE | 10 2005 035913 A1 | 2/2007 |
| FR | 2299982 A1 | 9/1976 |
| JP | 63-232010 A | 9/1988 |
| JP | 3-93613 A * | 9/1991 |
| JP | 4-237611 A | 8/1992 |
| JP | 5-4403 Y2 | 2/1993 |
| JP | 05-278420 A | 10/1993 |
| JP | 2003-182331 A | 7/2003 |
| JP | 2005247043 A | 9/2005 |

* cited by examiner

*Primary Examiner* — Joseph Rocca
(74) *Attorney, Agent, or Firm* — Carrier Blackman & Associates, P.C.; Joseph P. Carrier; William D. Blackman

(57) ABSTRACT

A ball joint assembly includes a stud bracket having the shape of a rectangular block, a first ball joint connected to an upper surface of the stud bracket and a second ball joint connected to a lower surface of the stud bracket. The first and second ball joints extend from the stud bracket at an angular displacement of 180 degrees and with a relatively small distance defined therebetween as seen in plan view. The stud bracket comprises a bracket main body having a rectangular shape and integrally including a pair of ball studs extending from the upper and lower surfaces thereof.

5 Claims, 10 Drawing Sheets

WHEEL SUSPENSION SYSTEM FOR A STEERABLE WHEEL

TECHNICAL FIELD

The present invention relates to a wheel suspension system for a steerable wheel of a double-joint type including a knuckle and a pair of lower arms connected thereto, and in particular to a technology for reducing the torque required for steering.

BACKGROUND OF THE INVENTION

An automotive wheel suspension system for a steerable wheel typically includes a knuckle rotatably supporting a wheel and configured to be actuated by a steering gear, various arms and links (simply referred to as "arms" hereinafter) connecting the knuckle to a vehicle body, a spring for cushioning the input from the road surface and a damper for damping the vertical oscillating movement of the wheel. The Macpherson strut type, double-wishbone type and few other types have been preferred as suspension systems for a steerable wheel. In particular, recent development efforts have been directed to various forms of double-joint type wheel suspension systems that provide an increased freedom in setting the king pin (see patent documents 1 and 2).

The double-joint wheel suspension system is considered as a modification of a Macpherson strut type or double-wishbone type wheel suspension; at least one of the upper and lower arms (typically consisting of an A-arm) of the latter is separated into two separate arms. The first arm is connected to the knuckle via a first ball joint, and the second arm is connected to the knuckle via a second ball joint. In a double-joint wheel suspension system, an instantaneous center of rotation of an imaginary king pin passes through an intersection between extension lines of the first and second arms. Therefore, the king pin offset (wheel center offset) can be minimized by tilting the king pin more than usual, and this contributes to the reduction in the sensitivity to external interferences and torque steer while improving the steering feel. A typical ball joint used in a double-joint wheel suspension system comprises a ball stud consisting of a ball portion and a shank portion, a socket that receives the ball portion and a nut that threads with an outer thread formed in the shank portion of the ball stud, and the shank portion of the ball stud is fixedly secured to an upwardly facing or downwardly facing surface of the knuckle.

patent document 1: Japanese patent laid open publication No. 63-232010
patent document 2: Japanese patent laid open publication No. 5-278420

BRIEF SUMMARY OF THE INVENTION

Tasks to be Accomplished by the Invention

In the double-joint wheel suspension system discussed above, the first and second ball joints are attached to a same surface (upwardly facing surface or downwardly facing surface) of the knuckle. Therefore, the swing area of the wheel during a steering operation tends to be greater than that of a more conventional wheel suspension system, and this increases the dragging resistance of the tire and the torque required for raising the wheel when steering the wheels while the vehicle is stationary. As a result, a greater steering torque input is required (force required for the steering gear to actuate the knuckle).

This tendency becomes more pronounced when the space between the two ball joints is increased. Therefore, when designing a double-joint wheel suspension system, it is desirable to minimize the spacing between the first and second ball joints. However, when the first and second ball joints are both attached to a same plane of the knuckle, a certain significant space is required to be provided between the first and second ball joints so that the two ball joints do not interfere with each other and access of a tool to each ball joint needs to be ensured. This necessitated an increase in the size of the steering system, and the required output of the steering system.

In view of such problems of the prior art, a primary object of the present invention is to provide a double-joint type suspension system for a steerable wheel than can minimize the necessary steering torque.

Means to Accomplish the Tasks

To achieve such an object, according to a first aspect of the present invention, the present invention provides a double-joint type wheel suspension system for a steerable wheel, comprising: a knuckle rotatively supporting a wheel, and configured to turn around an imaginary king pin axis; a first arm having one end connected to a vehicle body member and another end connected to an upper or lower part of the knuckle via a first ball joint so as to swingably support the knuckle with respect to a vehicle body; and a second arm having one end connected to a vehicle body member and another end connected a part of the knuckle adjacent to the first ball joint via a second ball joint so as to swingably support the knuckle with respect to the vehicle body in cooperation with the first arm; wherein the knuckle is provided with a stud bracket retaining a ball stud of the first ball joint and a ball stud of the second ball joint.

According to a second aspect of the present invention, there is provided a double-joint type wheel suspension system for a steerable wheel according to the first aspect, wherein the stud bracket retains the ball stud of the first ball joint and the ball stud of the second ball joint such that the ball studs extend from the stud bracket at mutually different angles.

According to a third aspect of the present invention, there is provided a double-joint type wheel suspension system for a steerable wheel according to the first aspect, wherein the stud bracket is fastened to the knuckle, and the ball studs of the first and second ball joints are integrally formed with the stud bracket.

According to a fourth aspect of the present invention, there is provided a double-joint type wheel suspension system for a steerable wheel according to the first aspect, wherein the stud bracket is integrally formed with the knuckle, and the ball studs of the first and second ball joints are integrally formed with the stud bracket.

According to a fifth aspect of the present invention, there is provided a double-joint type wheel suspension system for a steerable wheel according to the first aspect, wherein the ball stud of the first ball joint extends from an upper part of the stud bracket, and the ball stud of the second ball joint extends from a lower part of the stud bracket.

According to a sixth aspect of the present invention, there is provided a double-joint type wheel suspension system for a steerable wheel according to claim 1, wherein each of the first and second ball joints comprises a ball portion formed at an end of the ball joint and a sleeve portion for pivotally supporting the ball portion via a ball socket; and at least one end of each of the first and second ball joints is formed as the sleeve portion.

Effect of the Invention

According to a first aspect of the present invention, because the spacing between the first and second ball joints can be selected relatively freely, the swing area of the wheel during a steering operation can be minimized, and this contributes to the reduction in the size and required output of the steering system. According to a second aspect of the present invention, the first ball joint and second ball joint can be brought close to each other in plan view without actually unduly reducing the distance between the first and second ball joints so that the swing area of the wheel during a steering operation can be minimized. According to a third aspect of the present invention, the knuckle can be made of aluminum alloy that may have a relatively low mechanical strength, and the machining and grinding of the ball studs can be simplified. Also, by combining the first and second arms and stud bracket as a single subassembly, the assembly work can be simplified. According to a fourth aspect of the present invention, the number of component parts and manufacturing steps for the manufacture of the wheel suspension system can be reduced even further, and this contributes to cost reduction. According to fifth aspect of the present invention. The first ball joint and second ball joint may be brought close enough to each other for the two ball joints to overlap each other as seen in plan view so that the swing area of the wheel during a steering operation may be minimized. According to a sixth aspect of the present invention, because an end of each lower arm serves as the sleeve portion of the ball joint, the numbers of component parts and manufacturing steps can be both reduced.

BRIEF DESCRIPTION OF THE DRAWINGS

Now the present invention is described in the following with reference to the appended drawings, in which.

DETAILED DESCRIPTION OF THE PREFERRED EMBODIMENT(S)

Now the present invention is described in the following in more detail in terms of a concrete embodiment of the automotive wheel suspension system and modified embodiments thereof with reference to the appended drawings.

Preferred Embodiment

Figure 1:
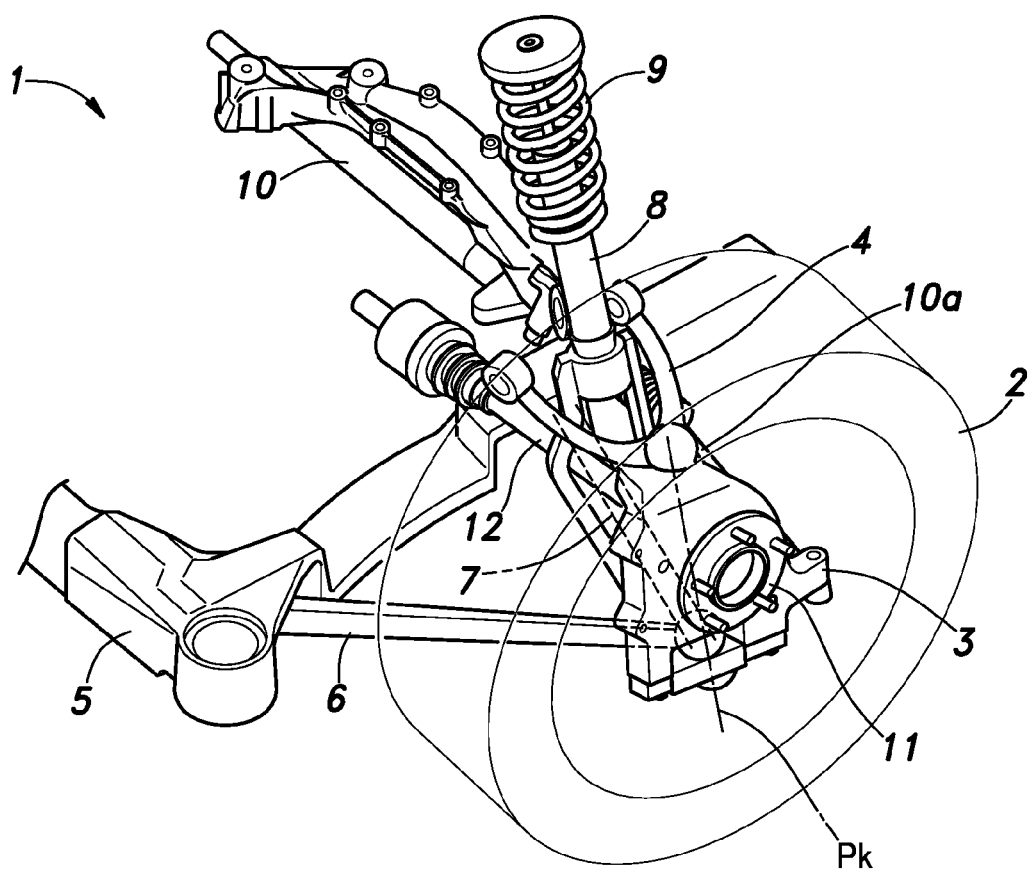
FIG. 1 is a perspective view of a first embodiment of an automotive front wheel suspension system embodying the present invention.
Figure 2:
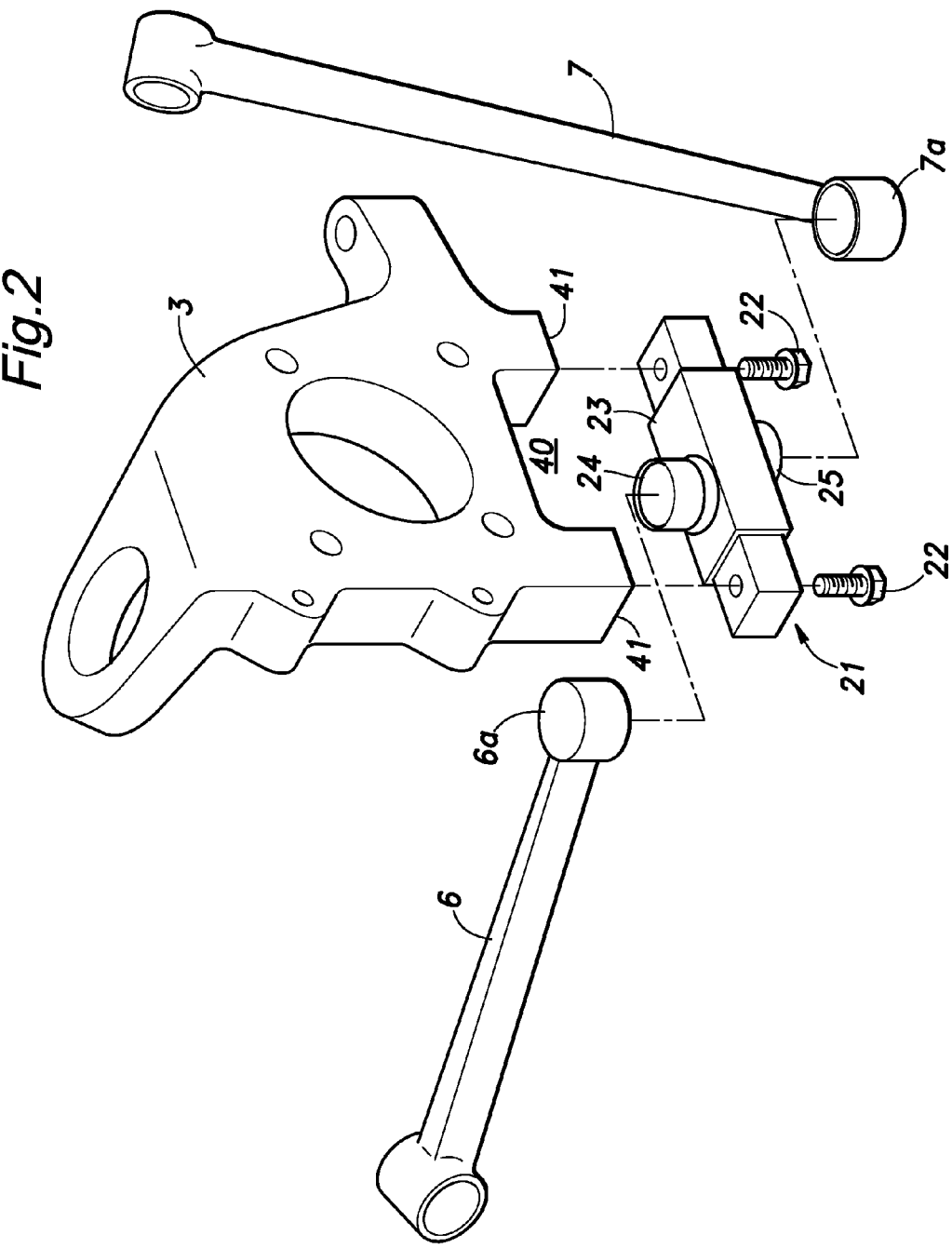
FIG. 2 is an exploded perspective view of the knuckle and lower arms of the first embodiment.
Figure 3:
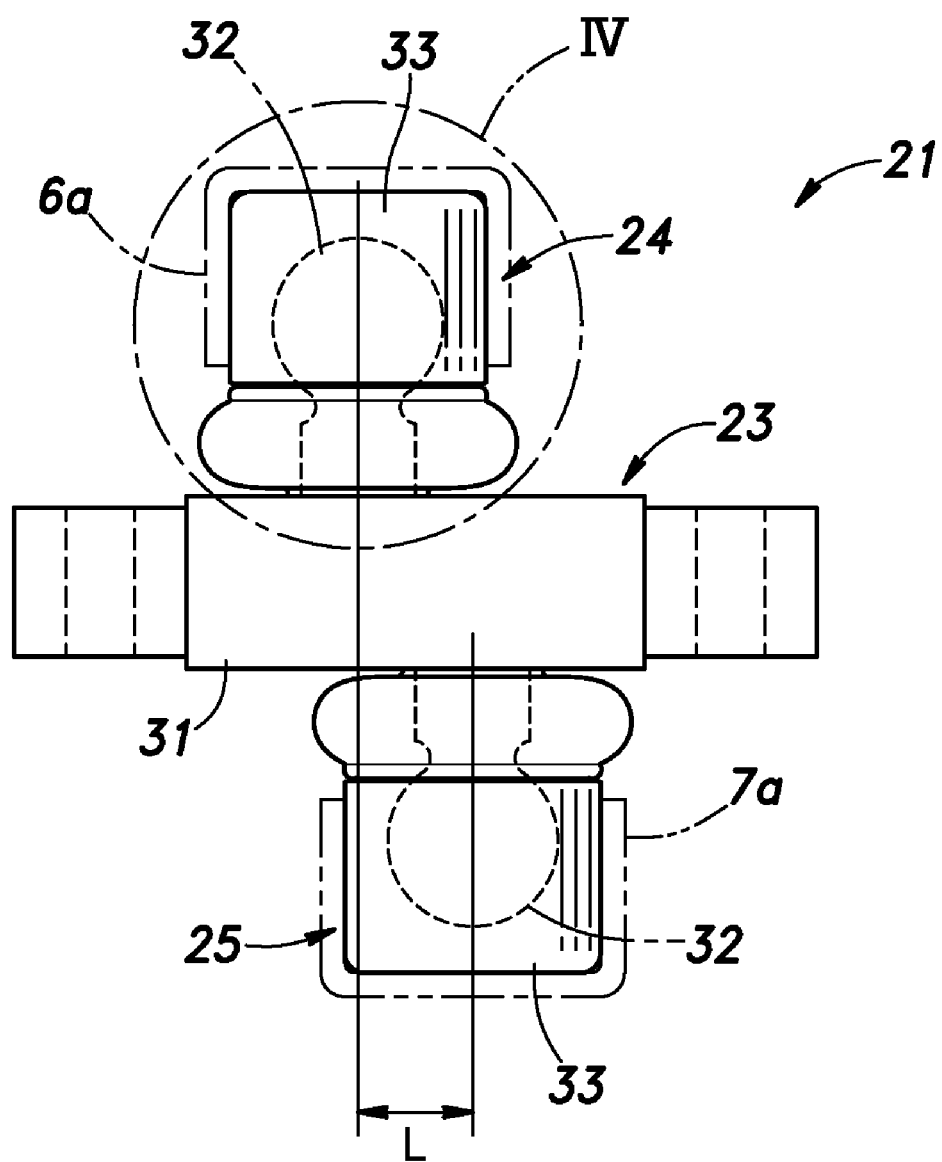
FIG. 3 is a side view of the ball joint assembly of the first embodiment.
Figure 4:
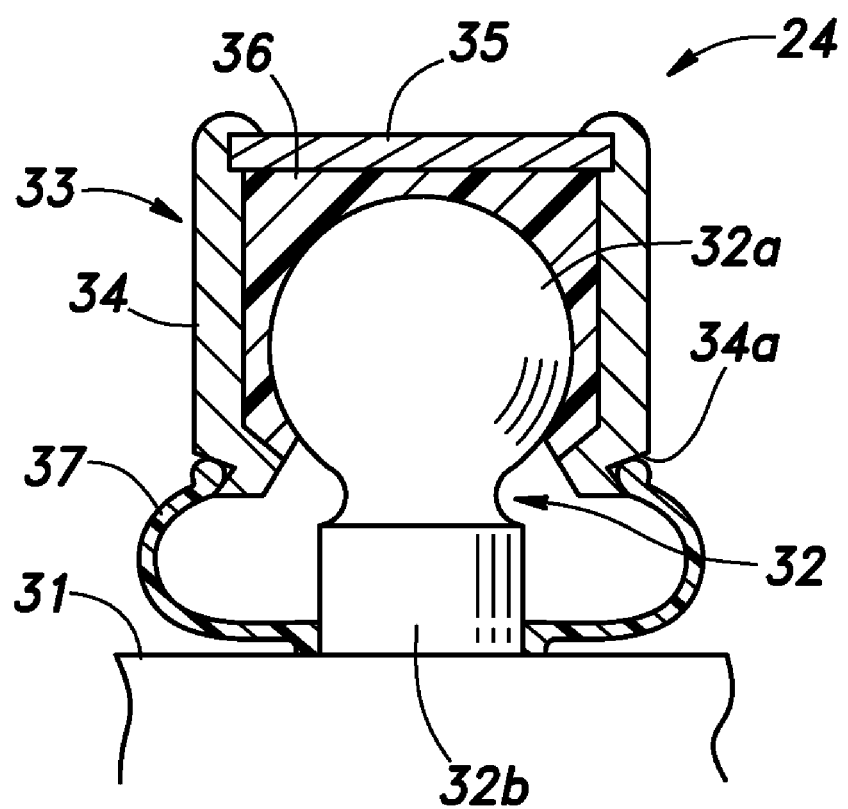
FIG. 4 is a fragmentary vertical sectional view of the part indicated by IV in FIG. 3.

FIG. 1 is a perspective view of a front wheel suspension system embodying the present invention, and FIG. 2 is an exploded perspective view of a knuckle and lower arms of the first embodiment. FIG. 3 is a side view of a ball joint assembly of the first embodiment, and FIG. 4 is a fragmentary vertical sectional view of the part indicated by IV in FIG. 3.

Structure of the Preferred Embodiment

<Front Suspension System>

In FIG. 1 is generally illustrated a double-joint wheel suspension system 1 (for a steerable wheel) embodying the present invention which in this case consists of an in-wheel type, double-wishbone type front wheel suspension system. This wheel suspension system 1 comprises a knuckle 3 that is made of die cast aluminum alloy and supports a road wheel 2 in a rotatable manner, an upper arm 4 connecting an upper part of the knuckle 3 with a wheel house (a vehicle body side member), a first and second lower arm 6 and 7 connecting lower parts of the knuckle 3 with a front suspension member 5 (a vehicle body side member), a hydraulic damper 8 interposed between the second lower arm 7 and wheel house and a coil spring 9 connected to an upper part of the hydraulic damper 8.

Additionally, a tie rod 10a of a steering gear 10 is connected to a part of the knuckle 3 to enable the knuckle 3 to be turned for a steering movement around an imaginary king pin axis Pk in response to an angular movement of a steering wheel effected by a vehicle operator. A lower instantaneous center of rotation of the imaginary king pin axis Pk passes through a point of intersection between the axial lines of the extensions of the first lower arm 6 and second lower arm 7. In the illustrated front wheel suspension system 1, a distance between a point at which the imaginary king pin axis Pk intersects the ground and the center of the ground contact area of the wheel 2 (or a kingpin offset or a scrub radius) is significantly smaller than those of normal suspension systems. The knuckle 3 supports a hub 11 via a hub bearing (not shown in the drawing), and the hub 11 is in turn connected to a drive shaft 12.

<Ball Joint Assembly>

Referring FIG. 2, a ball joint assembly 21 formed separately from the knuckle 3 is attached to a downwardly facing surface 41 of the knuckle 3 via a pair of threaded bolts 22. As shown in FIG. 3, the ball joint assembly 21 includes a stud bracket 23 formed as a rectangular block member, a first ball joint 24 mounted on an upper surface of the stud bracket 23 and a second ball joint 25 mounted on a lower surface of the stud bracket 23.

In the illustrated embodiment, the first ball joint 24 and second ball joint 25 project from the stud bracket 23 with an angular difference of 180 degrees (or extend above and below the stud bracket 23, respectively), and are spaced from each other with a relatively small distance L between them as seen in plan view. In the assembly process of the vehicle, the first and second lower arms 6 and 7 and the ball joint assembly 21 are supplied as a single subassembly in which the first ball joint 24 is press fitted into a retaining tubular portion 6a formed at one end of the first lower arm 6, and the second ball joint 25 is press fitted into a retaining tubular portion 7a formed at one end of the second lower arm 7. A lower part of the knuckle 3 is formed with a recess 40 which receives the first ball joint 24 along with the retaining tubular portion 6a of the first lower arm 6.

<Stud Bracket>

The stud bracket 23 is a solid, integral forged and machined member made of steel, and includes a bracket main body 31 consisting of a rectangular solid member and a pair of ball studs 32, one extending upward from the bracket main body 31 and the other extending downward therefrom. Each ball stud 32 includes a ball portion 32a and a shank portion 32b. The ball portion 32a is fitted into a socket 33 which includes a steel sleeve 34, an end plate 35 integrally secured to a free end portion of the sleeve 34 and a ball seat 36 made of oil pregnated plastic and retained by the sleeve 34 and end plate 35. A base end 34a of the sleeve 34 is inwardly crimped with the ball portion 32a of the bracket main body 31 received in the ball seat 36 so as to prevent the ball stud 32 from separating from the socket 33. A dust cover 37 made of elastomeric material such as rubber is provided between the shank portion 32b of the ball stud 32 and the crimped base end 34a of the sleeve 34 to prevent intrusion of foreign matters such as dust and moisture. The upper and lower ball studs 32 are disposed relative to each other so that the line perpendicular to a boundary line (circle) between the ball portion 32a and shank portion 32b of one of the ball studs 32 is at a different angle (180 degrees in the illustrated embodiment) from that of the other ball stud 32.

Mode of Operation of the Preferred Embodiment

Figure 5:
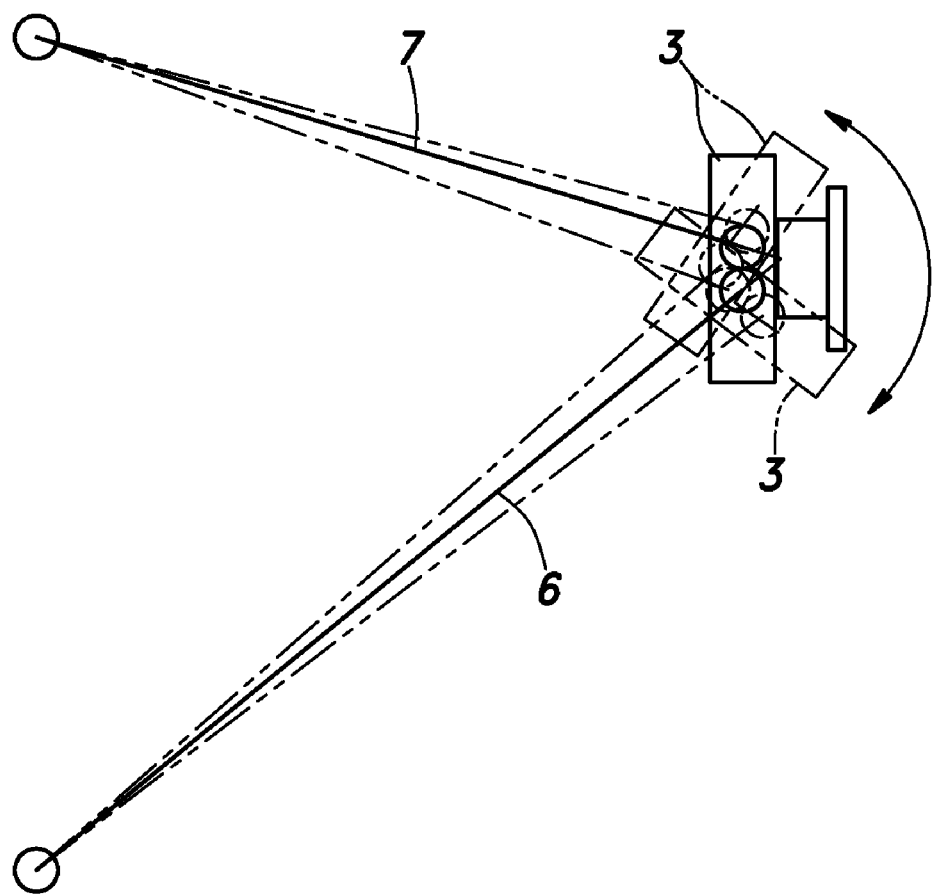
FIG. 5 is a diagram illustrating the mode of operation of the double-joint wheel suspension system of the present invention.

The illustrated embodiment consists of a double-joint wheel suspension system having a pair of lower arms 6 and 7, but allows the swing (wobbling movement) of the knuckle 3 (hence the swing of the wheel 2) at the time of a steering operation while the vehicle is kept stationary to be minimized as illustrated in FIG. 5. As a result, the scrubbing resistance of the tire particularly at the time of stationary steering and the torque required for raising the wheel 2 can be minimized. Also, because the first and second lower arms 6 and 7 and the ball joint assembly 21 are supplied as a single subassembly, the work efficiency at the assembly line can be improved.

First Modified Embodiment

Figure 6:
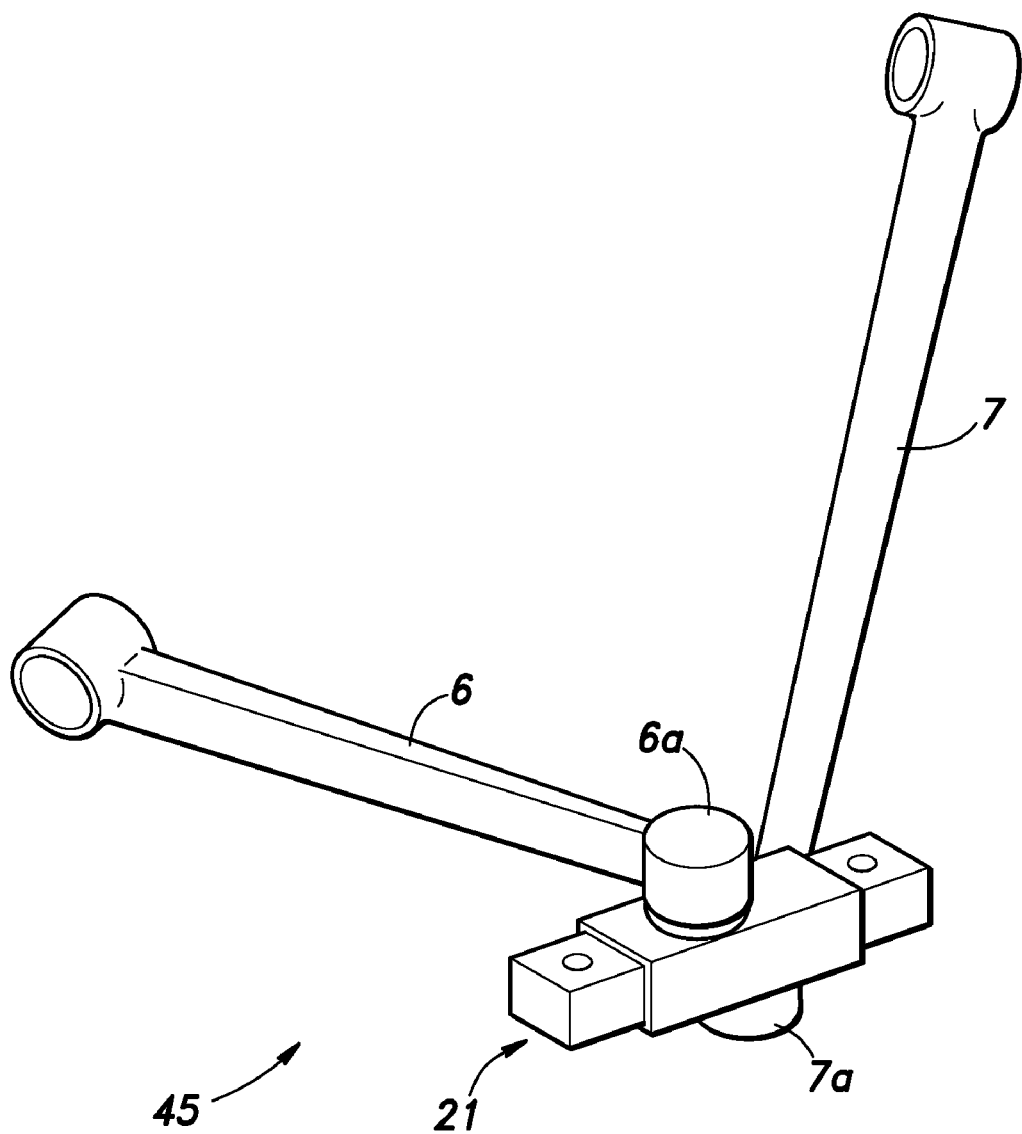
FIG. 6 is a perspective view of a lower arm assembly of a first modified embodiment.
Figure 7:
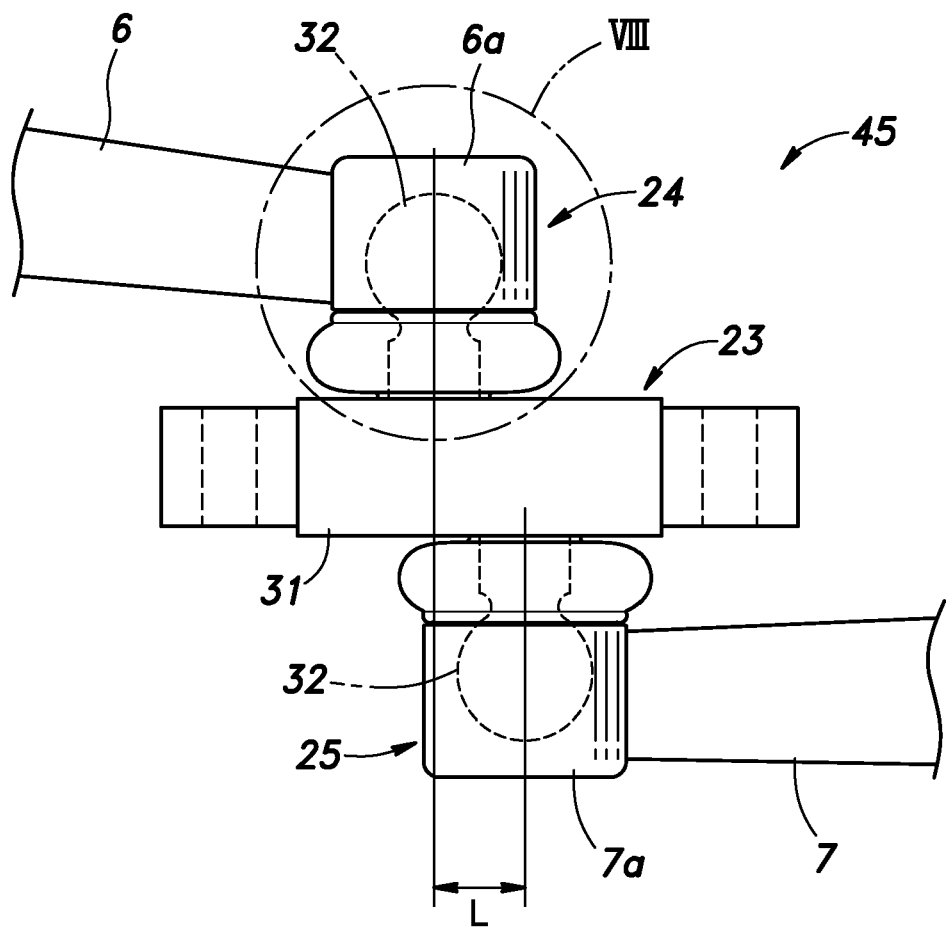
FIG. 7 is a fragmentary side view of the lower arm assembly of the first modified embodiment.
Figure 8:
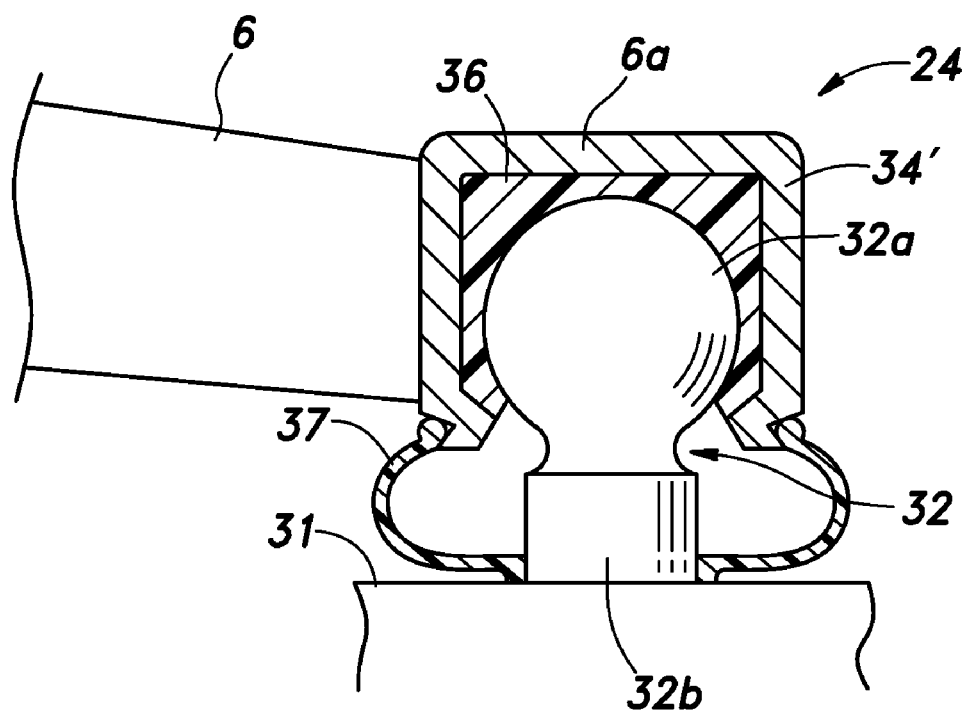
FIG. 8 is a fragmentary vertical sectional view of the part indicated by VIII in FIG. 7.

FIG. 6 is a perspective view showing a lower arm assembly of a front wheel suspension system of a first modified embodiment of the present invention. The first modified embodiment of the present invention is similar in structure to the preferred embodiment, but is provided with a lower arm assembly 45 including a stud bracket 23 to which the first and second lower arms 6 and 7 are connected. As shown in FIGS. 7 and 8, the knuckle ends 6a and 7a of the first and second lower arms 6 and 7 are each integrally formed with a sleeve 34' that serves as a part of the corresponding one of the first and second ball joints 24 and 25 and retains a ball portion 32a of a ball stud 32 of the corresponding stud bracket 23 via a ball seat 36. This embodiment provides the additional advantage of reducing the number of component parts and assembly steps for the front wheel suspension system 1, and thereby reducing the manufacturing cost.

Second Modified Embodiment

Figure 9:
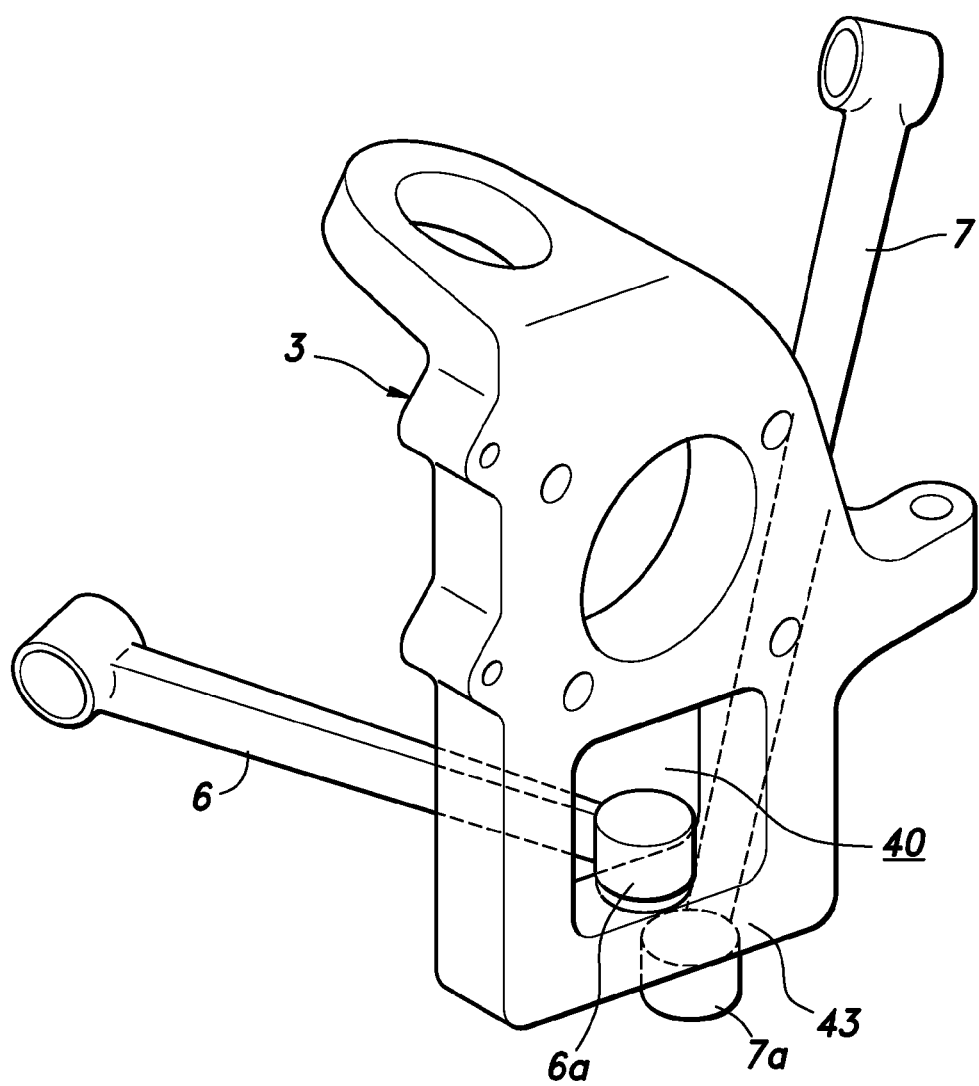
FIG. 9 is a perspective view showing an assembled state of a knuckle and lower arms of a second modified embodiment of the present invention.
Figure 10:
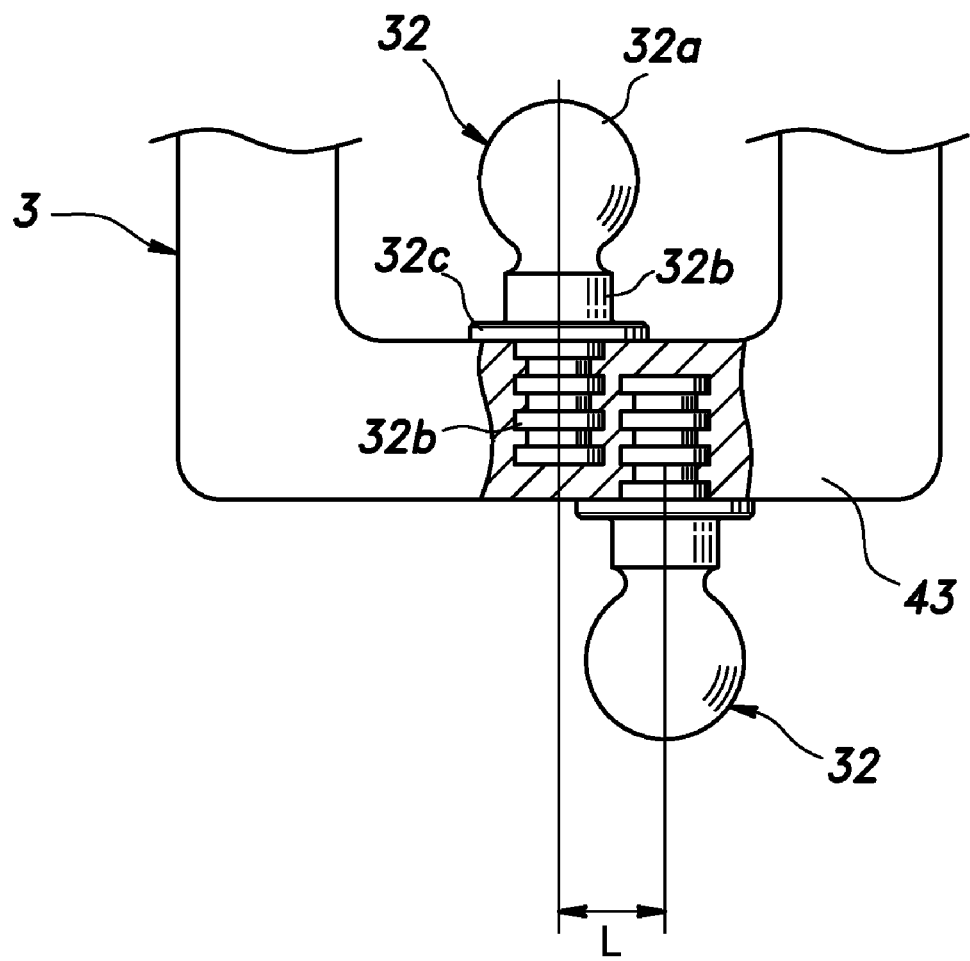
FIG. 10 is a fragmentary vertical sectional view of the knuckle of the second modified embodiment of the present invention.

FIG. 9 is a perspective view showing an assembled state of a knuckle and lower arms of a second modified embodiment of the present invention, and FIG. 10 is a fragmentary vertical sectional view of the knuckle of the second modified embodiment. The overall structure of this embodiment is similar to that of the previous embodiment, but differs therefrom in that no separate stud bracket is used. As shown in FIG. 9, the knuckle 3 of the illustrated embodiment includes a stud bracket 43 extending horizontally in a lower part thereof, and the first and second lower arms 6 and 7 are connected to the upper and lower surfaces of the stud bracket 43, respectively. As shown in FIG. 10, a pair of ball studs 32 are cast into the stud bracket 43 when casting the knuckle 3 at an angular interval of 180 degrees (or on the upper and lower sides of the stud bracket 43, respectively), and with a small space L defined therebetween as seen in plan view. Each ball stud 32 of the illustrated embodiment includes a flange 32c abutting the corresponding end surface of the stud bracket 43 and a stepped shank portion 32d cast into the stud bracket 43 in addition to a ball portion 32a and a shank portion 32b. In the second modified embodiment, owing to the above described structure, the number of component parts and assembly work steps required for the manufacture of the front wheel suspension system can be further reduced, and this contributes to the reduction of manufacturing cost.

The present invention was described in terms of specific embodiments, but the present invention is not limited by the illustrated embodiments, and can be changed in various parts thereof. For instance, the present invention was applied to the lower arms of an in-wheel type, double-wishbone type front wheel suspension system, but can also be applied to other types of wheel suspension systems such as double-joint wheel suspension systems based on the Macpherson strut type wheel suspension system, and double-joint wheel suspension systems other than the in-wheel type. The present invention may also be applied to the upper arms of such wheel suspension systems. In the first embodiment, the stud bracket and ball stud were integrally formed by a forge forming process, but it is also possible to cast a machined ball stud into a die cast stud bracket made of aluminum alloy or the shank portion of the ball stud may be threaded into the stud bracket. Furthermore, the angular and plan view spacings of the first and second ball joints as well as the concrete structure of the ball joints can be freely selected without departing from the spirit of the present invention.

The invention claimed is:

1. A double-joint wheel suspension system for a steerable wheel, comprising:
   a knuckle rotatively supporting a wheel, and configured to turn around an imaginary king pin axis;
   a first arm having one end connected to a vehicle body member and another end connected to an upper or lower part of the knuckle via a first ball joint so as to swingably support the knuckle with respect to a vehicle body; and
   a second arm having one end connected to a vehicle body member and another end connected a part of the knuckle adjacent to the first ball joint via a second ball joint so as to swingably support the knuckle with respect to the vehicle body in cooperation with the first arm;
   wherein the knuckle is provided with a stud bracket retaining a ball stud of the first ball joint and a ball stud of the second ball joint; wherein
   the ball stud of the first ball joint extends from an upper part of the stud bracket, and the ball stud of the second ball joint extends from a lower part of the stud bracket; and
   the ball studs are integrally formed with the stud bracket by forging the stud bracket with the ball studs, by casting the stud bracket with the ball studs, or by threading the ball studs into the stud bracket; wherein ends of the first and second ball joints opposite to the ball studs are disposed entirely within the stud bracket.

2. The double-joint wheel suspension system for a steerable wheel according to claim 1, wherein the stud bracket is fastened to the knuckle.

3. The double-joint wheel suspension system for a steerable wheel according to claim 1, wherein the stud bracket is integrally formed with the knuckle.

4. The double-joint wheel suspension system for a steerable wheel according to claim 1, wherein each of the first and second ball joints comprises a ball portion formed at an end of the ball stud and a sleeve portion for pivotally supporting the ball via a ball socket; and at least one end of each of the first and second arms is formed as the sleeve portion.

5. The double-joint wheel suspension system for a steerable wheel according to claim 1, wherein the first ball joint is received in a recess formed in a lower part of the knuckle.

* * * * *